R. E. GIBSON.
HOG HOLDER.
APPLICATION FILED SEPT. 29, 1914.
1,167,398.
Patented Jan. 11, 1916.
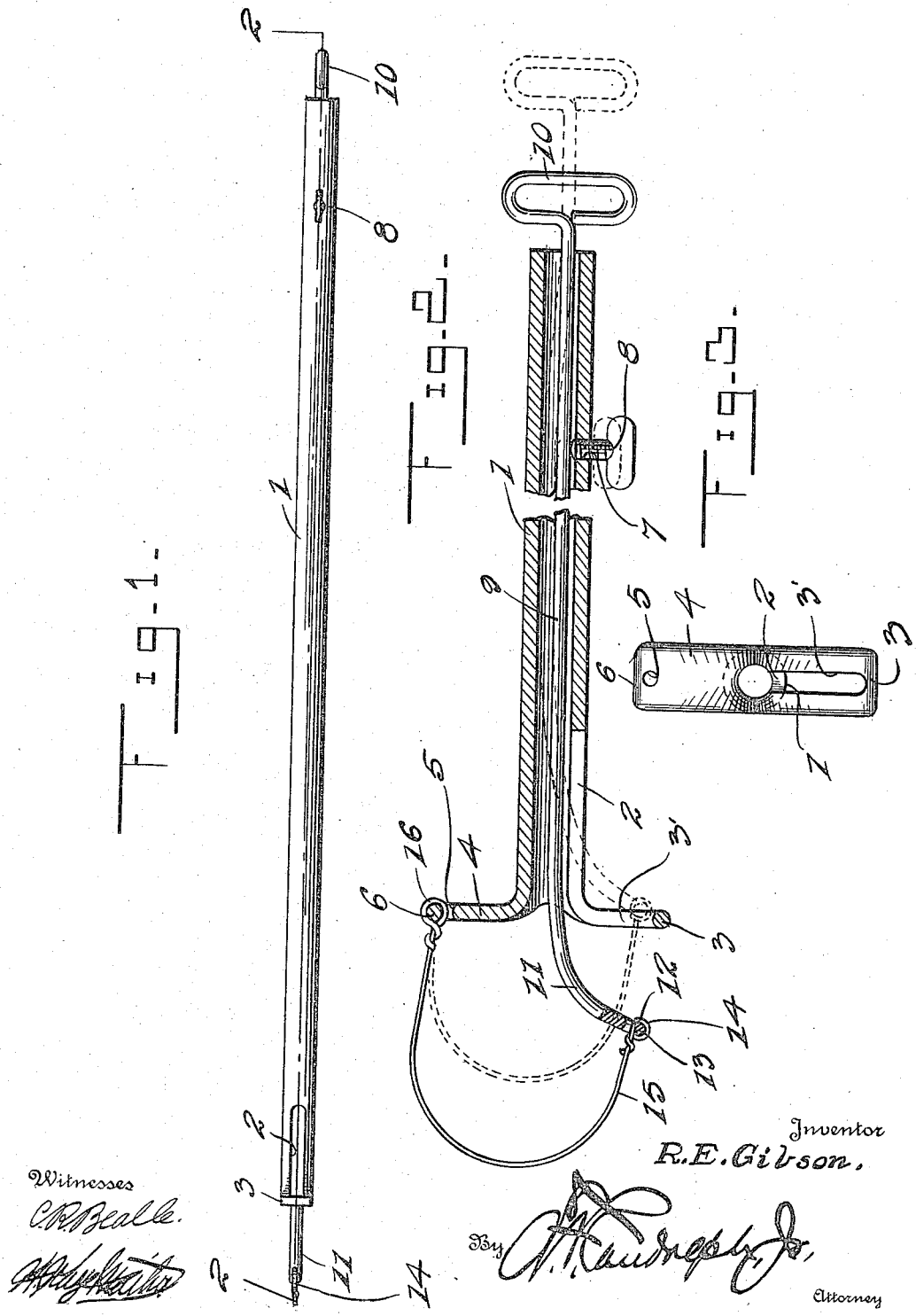
Witnesses
C. R. Beall.
Inventor
R. E. Gibson,
By [signature]
Attorney

UNITED STATES PATENT OFFICE.

ROSCOE E. GIBSON, OF PENDER, NEBRASKA.

HOG-HOLDER.

1,167,398.  Specification of Letters Patent.  Patented Jan. 11, 1916.

Application filed September 29, 1914. Serial No. 864,048.

*To all whom it may concern:*

Be it known that I, ROSCOE E. GIBSON, a citizen of the United States, residing at Pender, in the county of Thurston and State of Nebraska, have invented certain new and useful Improvements in Hog-Holders; and I do hereby declare the following to be a full, clear, and exact description of the invention, such as will enable others skilled in the art to which it appertains to make and use the same.

This invention relates to new and useful improvements in hog holders, and has for its principal object to provide a simple and effective device which may be attached to the snout of hogs in order that a person may catch and hold the same.

Another object of the invention is to provide a device which will remain in its locked position when so desired.

A further object of the invention is to provide a device which may be easily and cheaply constructed and which will be particularly simple and effective in use.

With these and other objects in view, the invention consists in the novel combination and arrangement of parts which will be fully set forth in the following specification and accompanying drawings, in which—

Figure 1 is an edge view of a hog holder constructed in accordance with this invention, Fig. 2 is a longitudinal sectional view taken on line 2—2 of Fig. 1, and Fig. 3 is an enlarged end view of the device showing the interior mechanism removed.

Referring now to the drawings by characters of reference, the numeral 1 designates the tubular casing which is provided near one end with the slot 2. This slot 2 extends to within close proximity of the end of the casing and is arranged to form a transversely extending bar 3 as clearly shown in the drawings. The end of the casing 1 in which the slot 2 is formed is preferably split to form arms which are bent angularly and designated by the numeral 4, and one of these arms is provided with the aperture 5, which is also arranged to form the transverse bar 6, the use of which will appear as the description proceeds. Formed in the casing 1 near the opposite end is the internally screw threaded aperture 7 in which the thumb screw 8 is arranged to be threaded.

Slidable longitudinally through the casing is the rod 9, having formed at one end the handle portion 10 and at the opposite end the angularly extending portion 11. This angularly extending portion is formed with the loop 12 which forms the transverse bar 13 around which the loop 14 of the wire 15 is bent. The opposite end of the wire is looped as at 16, and this loop is arranged to surround the bar 6 hereinbefore referred to.

From the foregoing it will be apparent that in use the hog is caught and the snout put through the loop of wire 15. Upward pull is then exerted on the handle member 10 which will cause the loop to contract into the position illustrated in the dotted lines, at which time the thumb screw 8 may be adjusted to frictionally engage the shank 9 and thus lock the device against movement. To release the hog, the thumb screw 8 is released and thus the shank is permitted to slide freely through the casing 1 and release the animal.

While in the foregoing there has been shown and described the preferred embodiment of this invention, it is to be understood that such changes may be made in the combination and arrangement of parts as will fall within the spirit and scope of the invention as defined in the appended claim.

What is claimed is:

A device of the class described including a cylindrical casing, a pair of arms extending laterally from one end of the casing, one of said arms provided with an elongated slot, the other of said arms having an aperture formed therein, a wire connected to the aperture of the arm, a shank slidable through the casing, a handle at one end of the shank, the opposite end being curved angularly and provided with a loop, the opposite end of the wire being connected to the loop at the end of the shank, and means intermediate the ends of the cylindrical casing for frictionally holding the shank against movement in the cylindrical casing.

In testimony whereof I affix my signature in presence of two witnesses.

ROSCOE E. GIBSON.

Witnesses:
 H. D. HANCOCK,
 E. A. WILTSE.